(12) United States Patent
Aregger (10) Patent No.: US 6,276,480 B1
(45) Date of Patent: Aug. 21, 2001

(54) THREE-WHEEL MOTOR VEHICLE (75) Inventor: Kurt Aregger, Emmenbrücke (CH)

(73) Assignee: Citymobil AG, Emmenbrücke (CH)

( * ) Notice: Subject to any disclaimer, the term of this patent is extended or adjusted under 35 U.S.C. 154(b) by 0 days.

(21) Appl. No.: 09/319,410

(22) PCT Filed: Dec. 1, 1997

(86) PCT No.: PCT/CH97/00452

§ 371 Date: Jun. 4, 1999

§ 102(e) Date: Jun. 4, 1999

(87) PCT Pub. No.: WO98/24681

PCT Pub. Date: Jun. 11, 1998

(30) Foreign Application Priority Data

Dec. 6, 1996 (CH) .................................. 2986/96

(51) Int. Cl.$^7$ .................................. B62D 61/08
(52) U.S. Cl. .................................. 180/213; 180/252; 280/62
(58) Field of Search .................................. 280/5.501, 5.507, 280/5.508, 5.509, 62, DIG. 5, 124.111, 282; 180/21, 210, 211, 213, 214, 252

(56) References Cited

U.S. PATENT DOCUMENTS

| 2,317,412 | * | 4/1943 | Shaffer | 180/210 |
|---|---|---|---|---|
| 2,606,623 | * | 8/1952 | Vickers | 180/21 |
| 3,605,929 |   | 9/1971 | Rolland . |   |
| 3,938,609 |   | 2/1976 | Kensaku et al. . |   |
| 4,159,752 |   | 7/1979 | Kanno . |   |
| 4,412,595 | * | 11/1983 | Kinzel | 180/211 |
| 4,580,797 | * | 4/1986 | Ericsson | 280/5.508 |
| 4,998,596 | * | 3/1991 | Miksitz | 280/62 |
| 5,116,069 | * | 5/1992 | Miller | 280/5.509 |
| 5,291,406 | * | 3/1994 | Williams et al. | 280/5.507 |
| 5,343,973 | * | 9/1994 | Lanker | 180/211 |
| 5,495,905 | * | 3/1996 | Fini, Jr. | 180/211 |

FOREIGN PATENT DOCUMENTS

| 529 188 | 3/1993 | (EP) . |   |
|---|---|---|---|
| 1562248 | 4/1969 | (FR) . |   |
| 2684606 | * 6/1993 | (FR) | 280/DIG. 5 |
| 2 014 094 | 8/1979 | (GB) . |   |
| 2 074 957 | 11/1981 | (GB) . |   |
| 2082517 | * 3/1982 | (GB) | 180/210 |
| 5-85453 | * 4/1993 | (JP) | 280/62 |

* cited by examiner

*Primary Examiner*—Frank Vanaman
(74) *Attorney, Agent, or Firm*—Pauley Petersen Kinn & Fejer (57) ABSTRACT

A three-wheeled vehicle having two parts that can be tilted around a longitudinal axis. A rear part has a chassis for two-track wheels and the front part, which can be tilted relative to the rear part, accommodates a driver seat. Connected to a front end of the front part is a tiltable front wheel suspension to which a front wheel and an engine and gears for the front-wheel drive are attached. The two vehicle parts that can be tilted relative to each other each support or form a body which can also be designed for the front part as a monocoque and forms a closed and heatable driver cabin.

18 Claims, 12 Drawing Sheets

THREE-WHEEL MOTOR VEHICLE

BACKGROUND OF THE INVENTION

1. Field of the Invention

This invention relates to a motor-driven three-wheeled vehicle for transporting at least one person and also material.

2. Description of Prior Art

Inner-city traffic suffers worldwide from the problem of notorious traffic jams due to excessive volumes of traffic and insufficient parking space. Since private transport is the most convenient for the user and also permits the transportation of objects at the same time, it is by far the most popular mode. Many people prefer private transport to public transport such as trains, trams and buses, even though they are obliged to spend a lot of time in traffic jams and looking for a place to park. The traffic situation in an existing road network is alleviated to some degree by compact cars for inner-city traffic, as developed and to some extent already launched by various car manufacturers. One conventional parking space can accommodate two such compact vehicles, which would double the parking space capacity if the traffic consisted solely of such compact vehicles.

Another alternative means of private transport is two-wheeled vehicles, ranging from bicycles to bicycles with an auxiliary motor, motorcycles, mopeds and scooters through to powerful motorbikes. But although all these two-wheeled vehicles are far narrower than two-track vehicles and also require very much less parking space, they are hardly suitable for use in bad weather. In the rain the driver unavoidably ends up more or less soaked through and in very cold weather the use of two-wheeled vehicles is unpleasant and not without risk to one's health. Driving on snow is also extremely dangerous. To protect himself or herself more effectively from the weather and also to be better protected in case of a fall, drivers of two-wheeled vehicles often wear special clothing, while drivers of motorized two-wheeled vehicles also wear a crash-helmet. And yet changing clothes and wearing a helmet is not particularly convenient. For example, anyone who travels to work daily has to get changed at his place of work, i.e. take off the leather suit before then putting on e.g. a suit. Wearing a helmet creates hairstyle problems for ladies and an elegant trouser suit or a skirt is impossible to wear underneath a leather suit. Hence the driver has to get changed before and after every journey. It is therefore evident that motorized two-wheeled vehicles are hardly suitable for everyone for a trip to the shops, the concert or even just for a normal evening out for a meal in a restaurant. And the simultaneous transportation of objects is limited to a degree on two-wheeled vehicles. To counteract these problems various city-mobiles in the form of very small three or four-wheeled vehicles with a cabin or a proper body have already been launched. These vehicles are often powered by a battery-driven electric motor which makes them quiet and emission-free to operate. The disadvantage lies in the often unsatisfactory engine power and in the limited radius of action. Furthermore, a heating system is often lacking for winter use. Motor-driven scooters with cabins used to be popular for one to two persons. But these vehicles had a similar track width to a small car and were equipped with a rear engine and rear drive, which left only a limited amount of storage space.

SUMMARY OF THE INVENTION

It is one object of this invention to provide a vehicle for alleviating an inner-city traffic situation and a lack of parking space. It is also intended that this vehicle be able to transport at least one person as economically as possible as regards the cost of purchasing and operating the vehicle. Furthermore, the vehicle is to be of a space-saving length and width, simple and comfortable to operate and very maneuverable. The vehicle is also to be sufficiently powerful to easily keep pace with conventional cars and, in addition, a radius of action permits the vehicle to be used for cross-country transport, like a car or a motorbike. In one preferred embodiment, the vehicle is also suitable for all-weather use and, in particular, has a heating system for winter use. In this version, the vehicle has a weatherproof and thief-proof storage space for transporting objects, which is at least big enough to carry a regular shopping load for a four-person family.

The objects of this invention are solved by a motor-driven three-wheeled vehicle as described in the specification and the claims.

BRIEF DESCRIPTION OF THE DRAWINGS

The drawings show various views of one embodiment of this three-wheeled vehicle, and a structure and individual parts of the three-wheeled vehicle and the way in which they function will be explained in the following description.

The drawings show this invention wherein.

DESCRIPTION OF PREFERRED EMBODIMENTS

Figure 1:
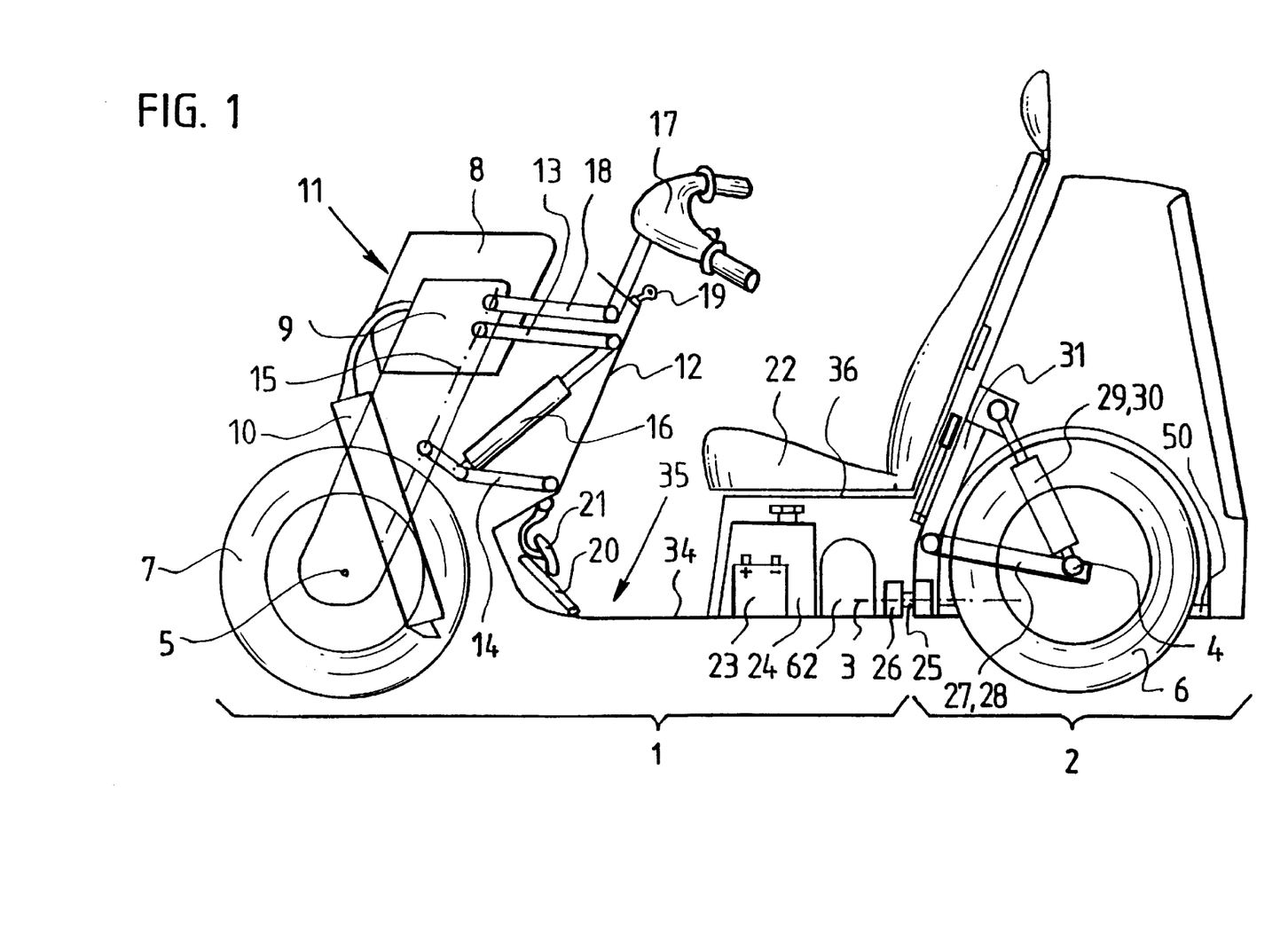
FIG. 1 is a diagrammatic side view of a motor-driven three-wheeled vehicle without a body.

FIG. 1 shows a diagrammatic side view of the motor-driven three-wheeled vehicle without a body to reveal essential technical features of the vehicle. The vehicle basically comprises a front vehicle part 1 and a rear vehicle part 2, with the two parts 1, 2 tiltable relative to each other about a longitudinal axis of the vehicle. A tilt axle 3 runs along a length of the vehicle and is located as low down as possible, certainly below the level of the wheel axles 4, 5. The front wheel 7 is of the type otherwise used on motorized scooters and the rear wheels 6 are car type wheels with a broad, cylindrical surface. The wheels 6 comprise, for example, a 13-inch cast wheel rim and a shrink-fit size 155/60 car tire. Other sized wheels can also be used, however, especially smaller wheels, so that a vehicle fitted with the wheels is maneuverable and so that the wheels and tires do not take up much room in relation to the overall volume of the vehicle. In one preferred embodiment, the vehicle has the front vehicle part 1 with a tiltable front wheel suspension 11 at the front, to which the front wheel 7, the engine 8 and the gears 9 are attached, thereby providing the vehicle with a front-wheel drive. The engine 8 and the gears 9 essentially form one structural unit, with the gearbox directly carrying the front wheel 7. The engine 8, the gears 9 and, in particular, the exhaust 10 are thus unsprung and are built to be as light and compact as possible in order to keep these unsprung masses to a minimum. The exhaust 10 is mounted to a side and opens close to the ground so that the exhaust gases escape underneath the vehicle in motion without dirtying it or allowing any gases to penetrate a driver space. The entire unit comprising the engine 8 with the exhaust 10, the gears 9 and the wheel 7 is tiltably connected with the frame part 12 of the front vehicle part 1 via a suspension 11.

The front vehicle part 1 comprises either a frame in the form of a chassis, onto which the driver space is built in the form of a body, or a monocoque body, preferably made from a fibre-reinforced polyester, from Kevlar™ material or from some other plastic. Sheet-metal can also be used as a building material for the body. In the example illustrated, the suspension 11 comprises two approximately parallel triangular steering elements 13, 14. The top triangular steering element 13 comprises two steering rods 13 which are fixed to the frame part 12 of the front vehicle part 1 or to the monocoque body such that they can be pivoted up and down. The two steering rods 13 run together in a direction of travel and are also fixed to a common axis 15 so that they can likewise be pivoted up and down. The lower steering rods 14 are connected in the same manner with the frame 12 or the body and the axis 15 and are bent in such a way as to ensure that if a frontal collision occurs, the steering rods 14 buckle at a pre-determined place and hence cannot penetrate into the driver space, like bolts. At a point where the triangular steering elements 13 are linked to it, the frame 12 is connected with the front portion of the lower triangular steering elements 14 via a strut with shock absorber 16 which runs downwards at an angle in the direction of travel. Hence the front frame part of the vehicle is supported by the strut with shock absorber 16. The structural unit comprising the engine 8, gears 9 and front wheel 7 can be tilted to a side around axis 15 which runs downwards at an angle in the direction of travel. The axis 15 runs downwards at an angle behind the front wheel axle 5, thereby giving the vehicle the desired roll steer stability. In a further embodiment, the steering axis 15 can be cast directly in the monocoque body or the front frame part.

A conventional two-wheel handlebar 17, which is connected via a steering linkage 18 with the structural unit comprising the engine 8, gears 9 and front wheel 7, is used to steer the vehicle. In addition to a high roll steer stability the entire steering geometry is designed such that steering forces are kept low in all driving situations so that even persons of slight build have no difficulty in steering the vehicle safely and easily. The front vehicle part 1 also includes the actual driver space which has a floor 34 designed in such a way that it forms a foot area 35 and a surface 36 for accommodating a driver seat 22. The floor 34 can be designed as part of a monocoque body and made accordingly from sheet-metal or a composite material.

The engine 8 is essentially controlled by two operating elements, namely an ignition key 19 on the one hand and an accelerator pedal 20 on the other hand, as is usual in a car. After switching on the ignition with an ignition key 19, the ignition key 19 is turned to activate the starter, which is mounted directly on the engine 8. The engine 8 is switched off by turning off the ignition using the ignition key 19. In the example shown, the accelerator pedal 20 is the only means of regulating the engine power. The gear mechanism 9, which is flange-mounted on the engine 8, is in this case fully automatic, so that the driver has nothing to do with the selection of the gears, but controls the speed solely by operating the accelerator pedal 20, as required. Reverse gear can be engaged by means of a belt drive in that a special electric engine with pulleys with a position relative to each other can be varied activates the belt drive when needed by means of a centrifugal clutch. This drive for reverse motion is completely integrated in the front suspension 11 of the engine 8, the gears 9 and the front wheel 7.

The braking system of the motor-driven three-wheeled vehicle comprises one or two hydraulic brake circuits plus a mechanical hand brake. By operating the brake pedal 21 the brake shoes of the disc brakes or drum brakes are simultaneously subjected to hydraulic pressure. A disc brake is preferably mounted on the front wheel, while either drum brakes or disc brakes can be used on the rear wheel. Hence each brake circuit acts on all three wheels. The braking force is regulated so that a greater braking force acts on the rear wheels 6.

The driver seat 22 is designed like a conventional car seat and therefore permits the driver to sit quite normally since one does not sit straddle-legged as on a motorbike. This three-wheeled vehicle can therefore easily be driven when the driver is wearing a tight skirt. The battery 23 and the fuel tank 24 are disposed under the driver seat 22. Also located under the driver seat 22 is the hydraulic unit 62 with related control system to operate the lift cylinders of a stabilizer device, which will be described with reference to FIGS. 8 and 9. In any case, this very compact and light hydraulic unit includes an electrically driven hydraulic pump, with both an electric motor and a pump being accommodated under the driver seat 22 for protection and economy of space.

The front vehicle part 1 ends behind the seat 22, where it is tiltably connected over a certain portion around axle 3 with the rear vehicle part 2 by means of a tilt shaft 25 that runs parallel to the vehicle's longitudinal axis. For this purpose the tilt shaft 25 is held in a pivot bearing 26 on the front vehicle part 1.

The rear vehicle part 2 comprises a frame 31 with two adjacent trailing arms 27, 28 running backwards approximately horizontally and fixed to the frame 31 such that they can be pivoted up and down, each supported in the vicinity of their rear end against the top part of frame 31 of the rear vehicle part 2 by means of a strut with a shock absorber 29, 30. The rear wheels 6 are mounted on the outside at the ends of the trailing arms 27, 28. Thus the rear vehicle part 2 remains horizontal around the longitudinal axis in any position of motion unless the vehicle is driven along a sloping plane. During normal travel, however, the rear vehicle part 2 remains stable around its longitudinal axis, i.e. it stands perpendicular on the road. In contrast, when negotiating a curve, the front part 1 inclines towards the inside of the curve like a motorbike. Driving tests have shown that although the tail may slip away a little if the adhesion friction on the rear wheels 6 is interrupted in a sharp curve, the vehicle can immediately be brought under control again without such slipping away causing a fall as would unavoidably be the case if the rear wheel of a motorbike swerves out. If the tail swerves out to a great extent then the transverse inclination of the front vehicle part 1 is restricted by special inclination limiters. These each contact on both sides with a limit stop, as is described in more detail in relation to FIG. 3.

Because of a front-wheel drive the rear vehicle part 2 is free of all drive elements and therefore forms a storage space with a large, flat floor 50 on which there is enough space for even a case of drinks containing 12 litre bottles. Moreover, the storage room can accommodate a volume of about at least 150 litres. Thus the storage room is sufficiently large for the regular shopping for a 4-person family.

Figure 2:
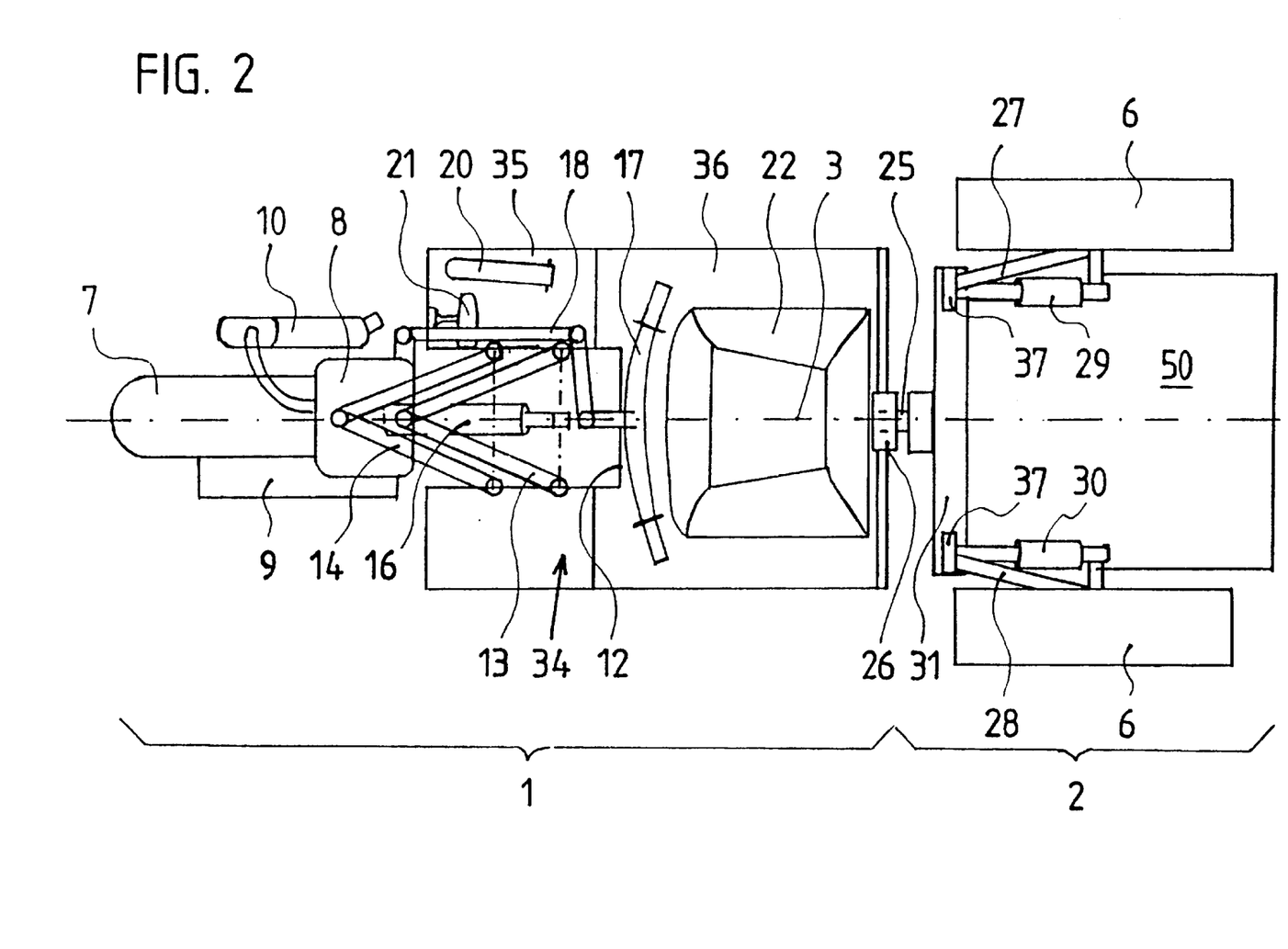
FIG. 2 is a diagrammatic top view of the motor-driven three-wheeled vehicle of FIG. 1 without a body.

FIG. 2 shows a diagrammatic top plan view of the same vehicle as FIG. 1. The front vehicle part 1 can clearly be differentiated from the rear vehicle part 2. The handlebar 17 is connected via the steering linkage 18 with the structural unit comprising the engine 8, the gears 9 and the front wheel 7. The structural unit is connected with the frame 12 or the body via the two superposed triangular steering elements 13, 14, and is supported against the frame 12 or the monocoque body by means of the strut with shock absorber 16. One also sees the exhaust 10, which is mounted on one side of the wheel 7 and has an outlet that lies near the ground.

Underneath the driver seat 22 the front vehicle part 1 has a floor plate 34 which rises at the back and then becomes a surface 36 for accommodating the driver seat 22. The accelerator pedal 20 and the brake pedal 21 are arranged next to each other according to the international convention in the foot area 35 of the floor plate 34. The entire front vehicle part 1 can be tilted around axis 3 relative to the rear vehicle part 2 by means of the tilt shaft 25. The tilt shaft 25, which is rigidly connected with the rear vehicle part 2, is mounted in a pivot bearing 26 on the front vehicle part 1. The rear vehicle part 2 comprises a frame 31 with the floor 50 and two upwardly directed supports 37 to which the top ends of the struts with shock absorbers 29, 30 are linked.

The rear wheels 6 are held by the two trailing arms 27, 28, which are linked at the front to the frame 31. At the rear, the struts with shock absorbers 29, 30 rest on the trailing arms 27, 28. The space between the two struts with shock absorbers 29, 30, i.e. between the two suspensions for the rear wheels 6 remains free. The space can be used as storage space for transporting goods. Because the rear wheels are suspended by means of trailing arms the storage space has a large, flat floor 50. A dimension of between 70 cm and 100 cm is preferably selected for the track. The length of the entire vehicle in the single-seat version is of the order of approximately 2.30 m.

Figure 3:
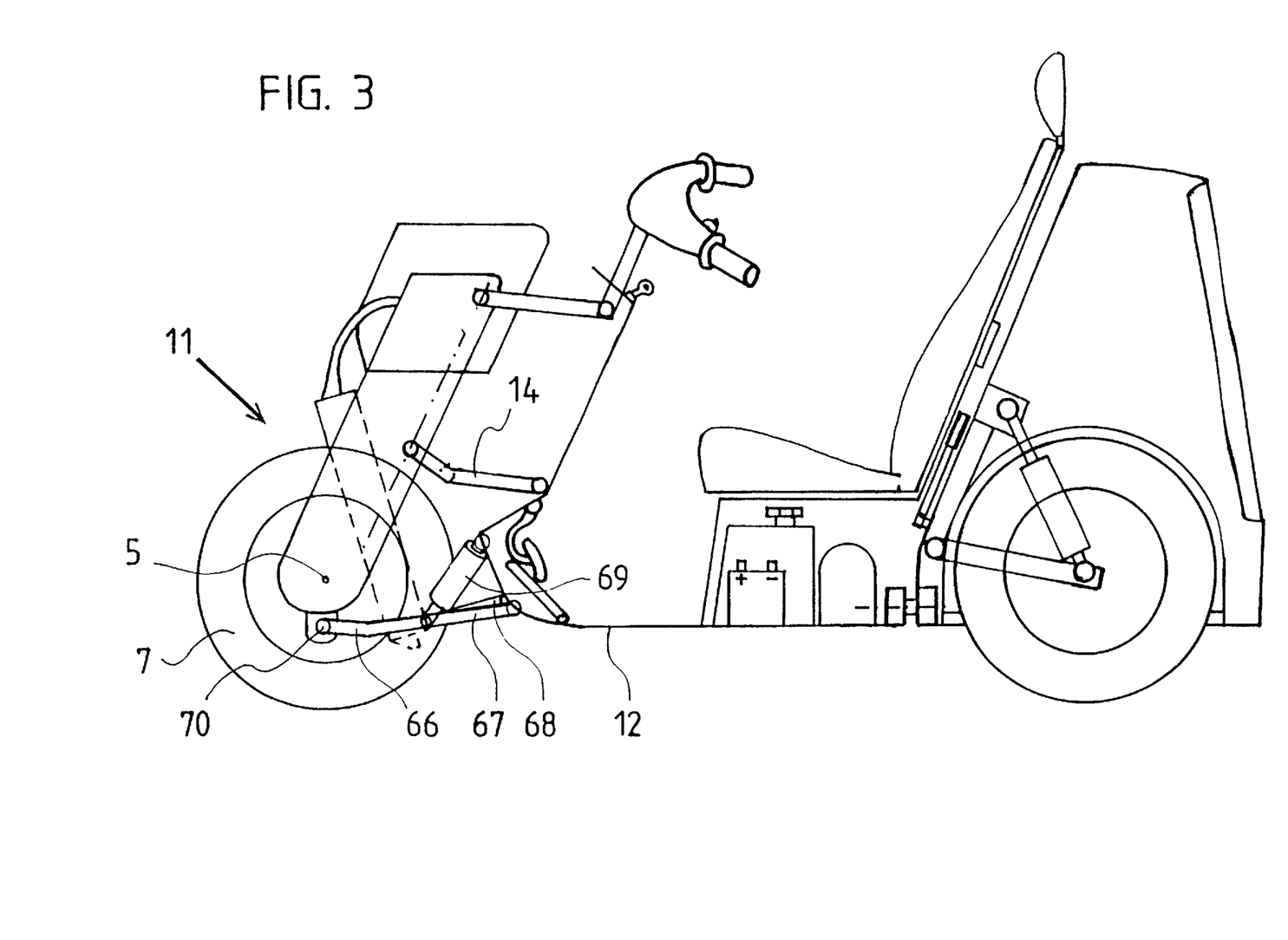
FIG. 3 is a diagrammatic side view of the motor-driven three-wheeled vehicle without a body and with an alternative front wheel suspension.

FIG. 3 shows the vehicle with an alternative front wheel suspension 11. While the front wheel 7 in the embodiment shown in FIGS. 1 and 2 is held at the top by triangular steering element 14, in this case the top triangular steering elements are replaced by a one-armed rocker arm 66 which guides the wheel 7 from one side. At the back the one-armed rocker arm 66 is forked and linked by the fork ends 66, 68 to two adjacent points on the frame 12 of the front vehicle part 1 or on the monocoque body so that the one-armed rocker arm 66 can oscillate vertically. The spring suspension and damping is accomplished by means of a strut with shock absorber 69 disposed between the one-armed rocker arm 66 and the frame 12. With this suspension, the wheel 7 is linked with the one-armed rocker arm 66 at a point 70 which is very close to the wheel axle 5. In the example shown the pivot point is arranged somewhat below the wheel axle 5 for reasons of space. This suspension with a one-armed rocker arm 66 gives the vehicle very good travel stability. Similar suspensions are used for the same reason on sidecar motorbikes for the front wheel of the motorbike.

Figure 4:
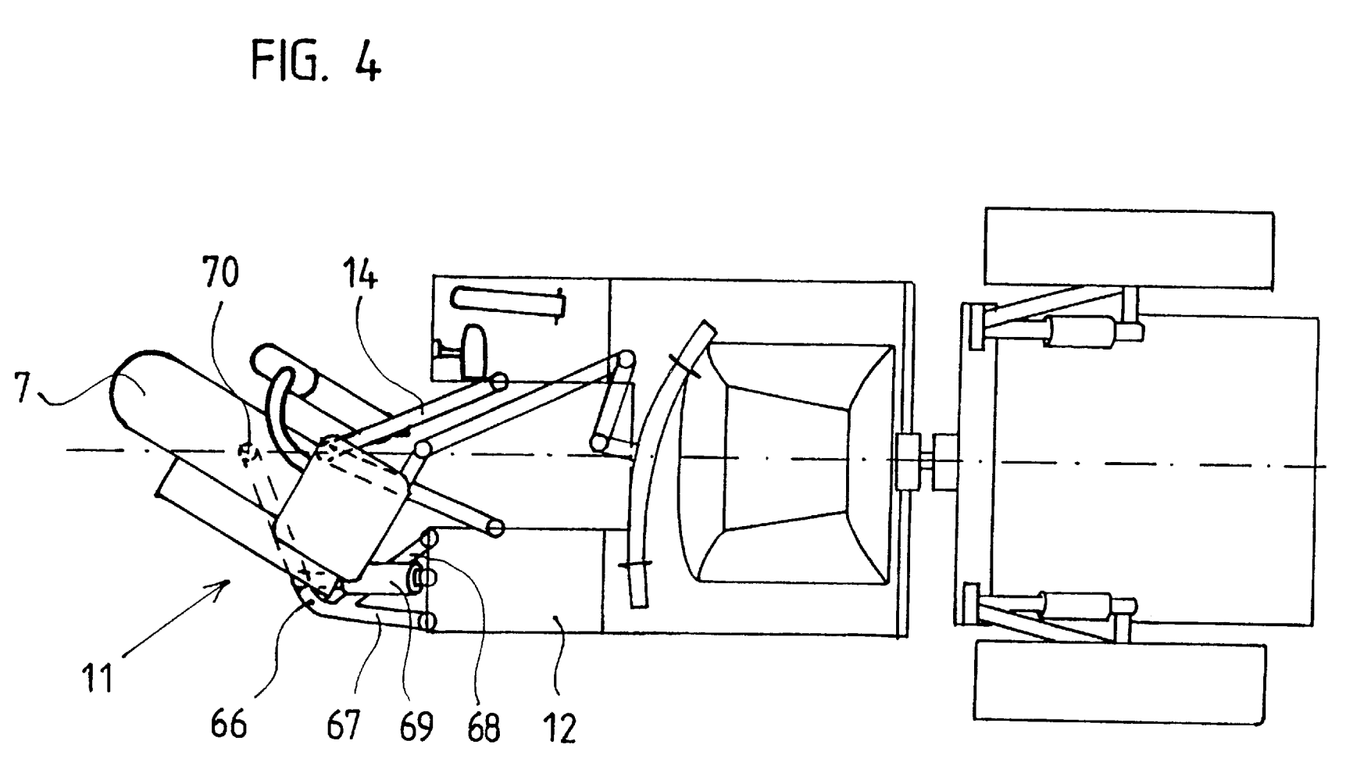
FIG. 4 is a diagrammatic top view of the motor-driven three-wheeled vehicle of FIG. 3 without a body and with the front wheel turned at an angle.

FIG. 4 shows a top plan view of the vehicle of FIG. 3 with the front wheel 7 turned to the right. The front wheel 7 is guided at two pivot points, namely at the top, by the ends of the triangular steering element 14 and at the bottom by pivot point 70 at the end of the one-armed rocker arm 66. The pivot point 70 of the one-armed rocker arm suspension lies in the transverse center of the wheel.

Figure 5:
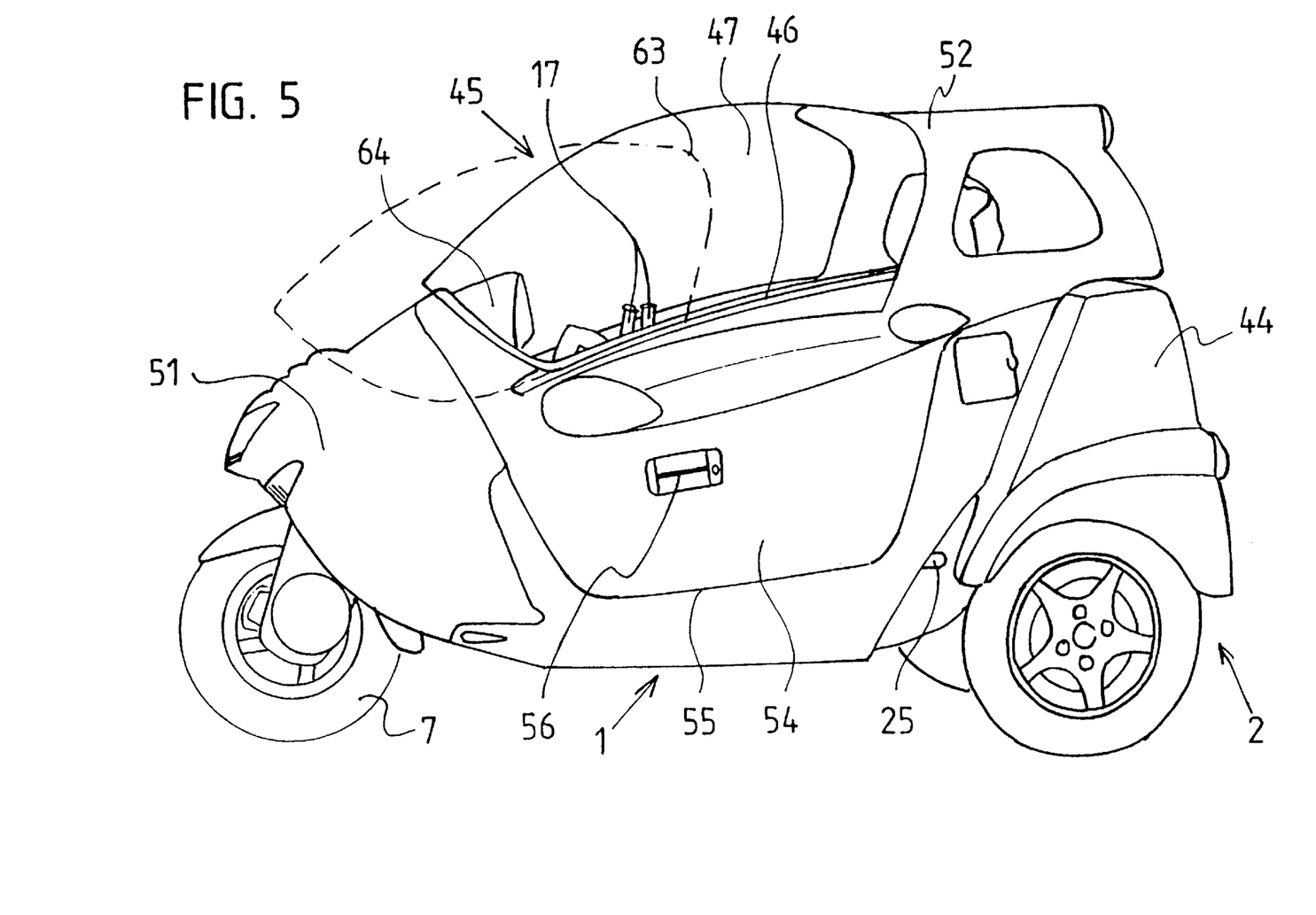
FIG. 5 is a side view of the motor-driven three-wheeled vehicle with a body and a closed driver cabin.

FIG. 5 shows a side view of the vehicle with the associated body which gives the entire vehicle more the appearance of a car than a motorbike, at least when viewed from the side. The body is advantageously designed as a monocoque body which is made, for example, from a composite material such as fiber-reinforced polyester or Kevlar™ material, or from sheet-steel. The body comprises essentially three separate structural elements. First of all, the engine and the gears are largely encased in a separate body part 51, with the body part 51 also covering the front wheel suspension. The body part 51 also accommodates the front headlights and the indicators and protects the front wheel suspension from dirt, improves the aerodynamics and contributes in a positive way to the aesthetic appearance of the vehicle. The front vehicle part 1 is rigidly connected with the body part 52, which basically forms a driver cabin 45. In motion, the body parts 51 and 52 both incline towards the inside of the curve like a motorbike. The driver cabin 45 has a bonnet window 47 which is in turn mounted on the body part 52 on curved rails 46 so that it can be opened forwards along the curved rails 46 by about a third of its length, like a sliding sun-roof. In fine weather the vehicle can thus be driven with the bonnet window 47 open. An open position 63 is shown by a dashed line. The sliding bonnet can advantageously be opened and closed electrically like an electric sun-roof in a car. The bonnet window 47 can even be completely removed, in which case only a small windscreen is mounted in its place.

Inside the driver cabin 45 one can identify the handlebar 17 and the dashboard 64. To get in and out of the vehicle, the bonnet window 47, which is fixed together with its rails 46 on hinges to the right side of the body part 52, is swung up and then away to the side like a wing door. On the left side of the body as shown in FIG. 5 the body part 52 is cut away deeper than only down to the bonnet window 47 which forms a door section 54 with lock and door latch or handle 56 and thereby creates a lower threshold 55 when the bonnet window 47 or door is open, making it easier to get in and out of the vehicle. Even drivers wearing skirts can get into the vehicle easily. When swung upwards, the door section 54 of the bonnet 47 provides a roof at the same time, so that one is protected from rain when getting in and out of the vehicle. The rear body part 44 is rigidly connected with the rear vehicle part 2. The body part 52 can be tilted relative to the rear body part 44 because the rear vehicle part 2 remains upright in the curves while the front vehicle part 1 leans into the curve. The tilting of the two vehicle parts 1, 2 and of their body parts 52, 44 is accomplished by means of the tilt shaft 25, as already described.

Figure 6:
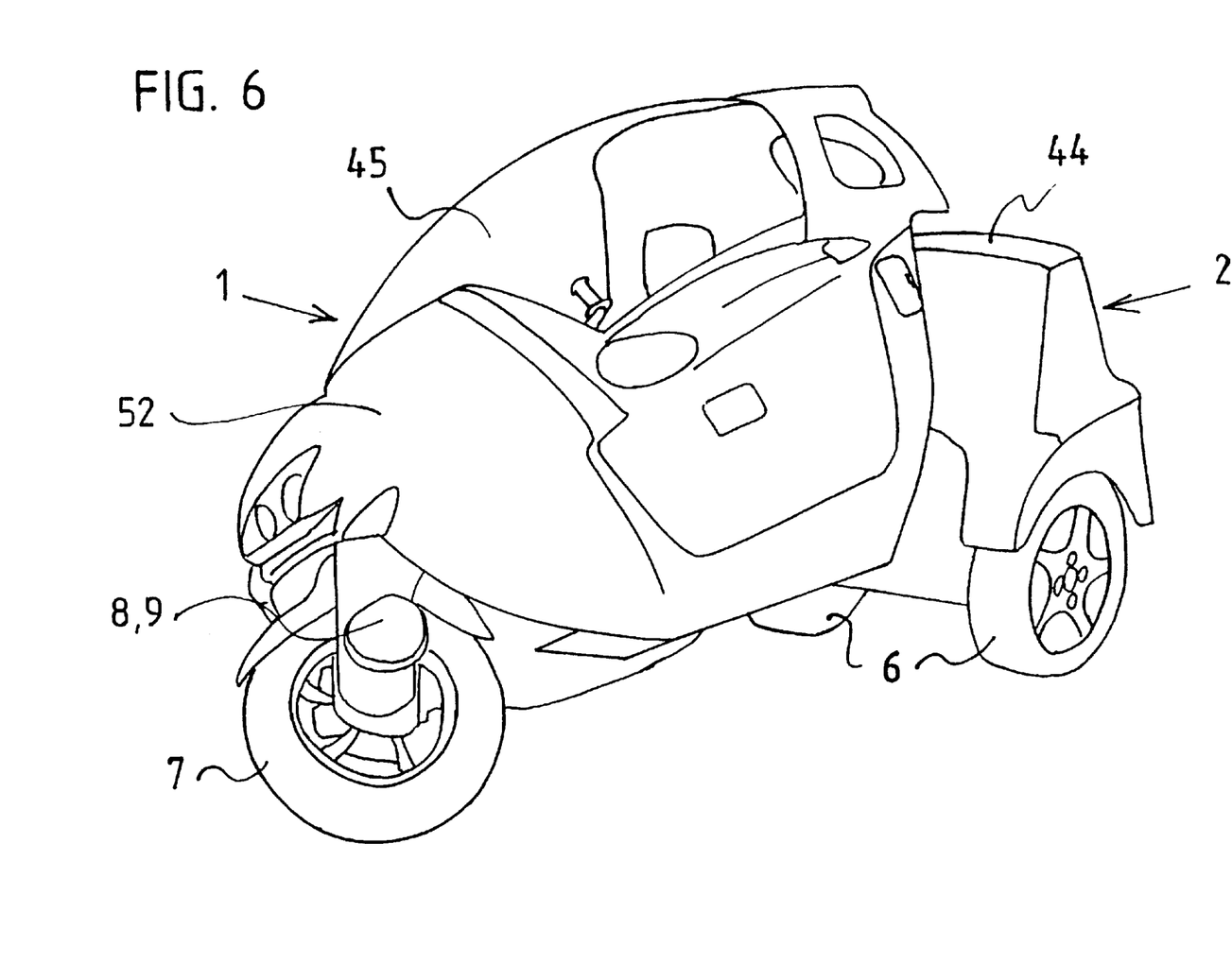
FIG. 6 is a front perspective view of the motor-driven three-wheeled vehicle as shown in FIG. 5 but tilting into a curve to the right, seen off-center from the front.
Figure 7:
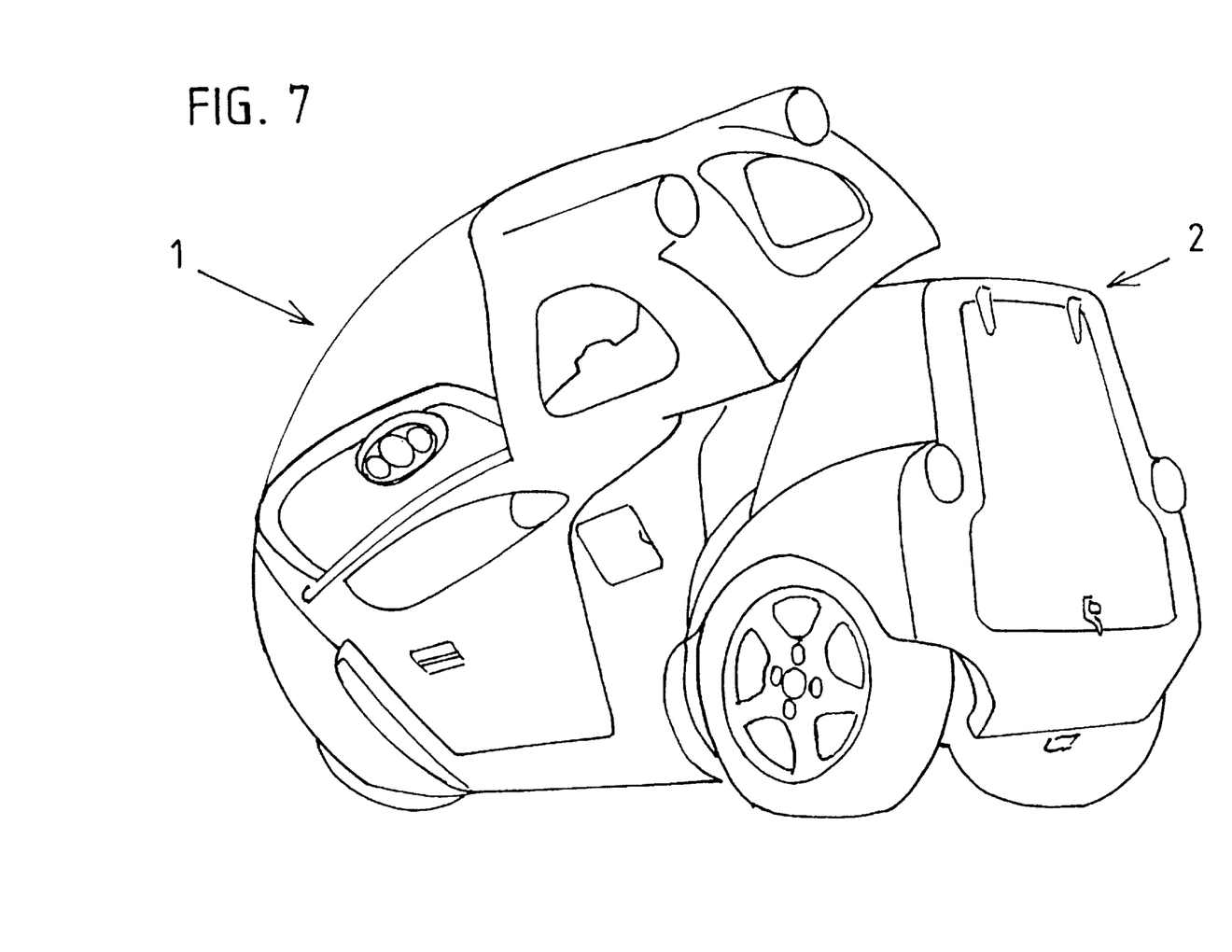
FIG. 7 is a rear perspective view of the motor-driven three-wheeled vehicle as shown in FIG. 5 but tilting into a curve to the left, seen off-center from the back.

FIG. 6 shows the vehicle tilting into a curve to the right, seen off-center from the front, while FIG. 7 shows the vehicle tilting into a curve to the left, seen off-center from the back. It is quite clear that the rear vehicle part 2 remains upright in the curve, and that only the front vehicle part 1 tilts into the curve.

Figure 8:
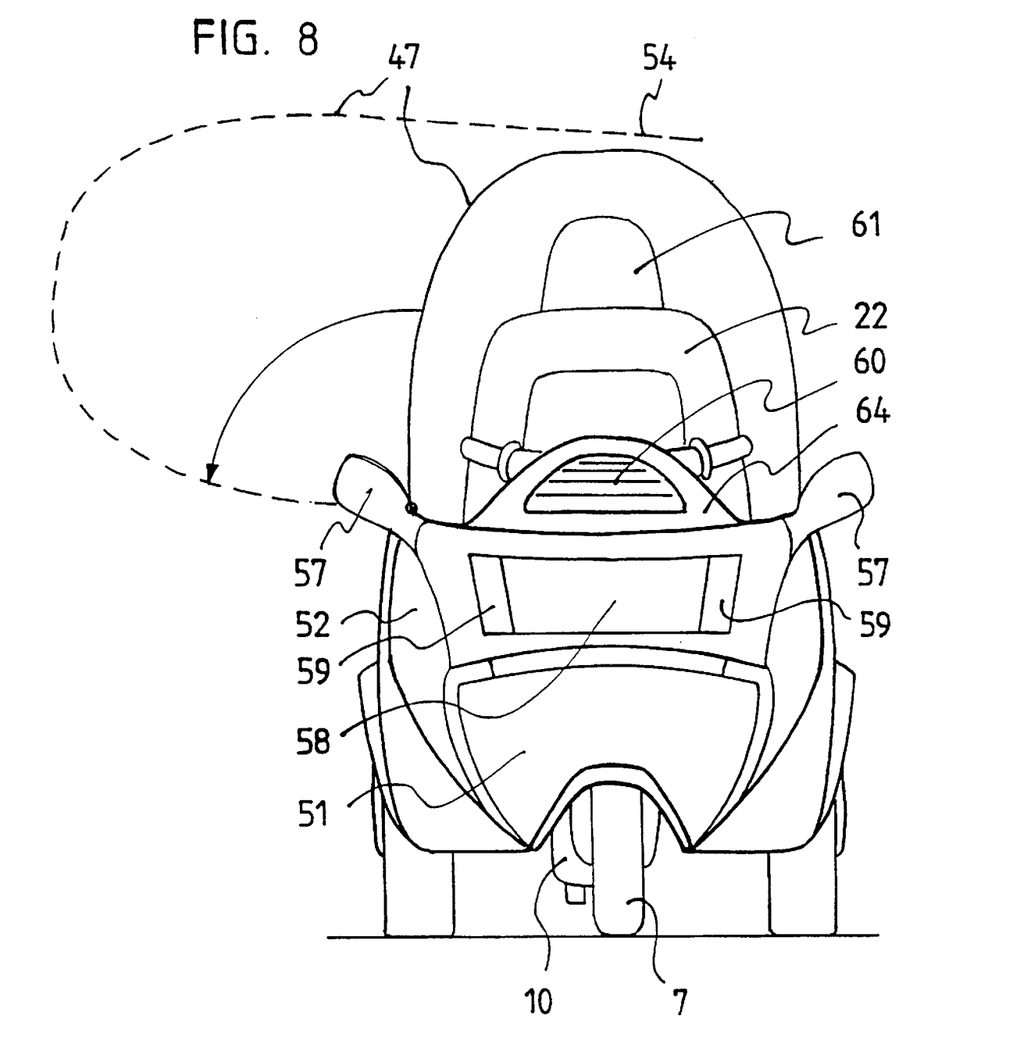
FIG. 8 is a front view of the motor-driven three-wheeled vehicle with a body.

FIG. 8 shows a front view of the vehicle. The bonnet window 47 is indicated in its open position by a dashed line. The body part 51, which encases the engine and the front wheel suspension, tilts with the front vehicle part 1 and interlocks for aerodynamic reasons with adjacent body part 52. Outer rear-view mirrors 57 are molded onto the left and right sides of body part 52. The body part 51 incorporates the main headlight 58 with adjacent indicator lights 59 on both sides. Inside the driver cabin 45 one sees the dashboard 64 with fan-grille 60 at the top, through which flows, as required, either warm air to defrost the windscreen and provide heat or cold air for cooling the vehicle by means of an air-conditioning unit. Behind the dashboard 64 one can identify the handlebar 17 and behind that the seat 22 with a headrest 61.

Figure 9:
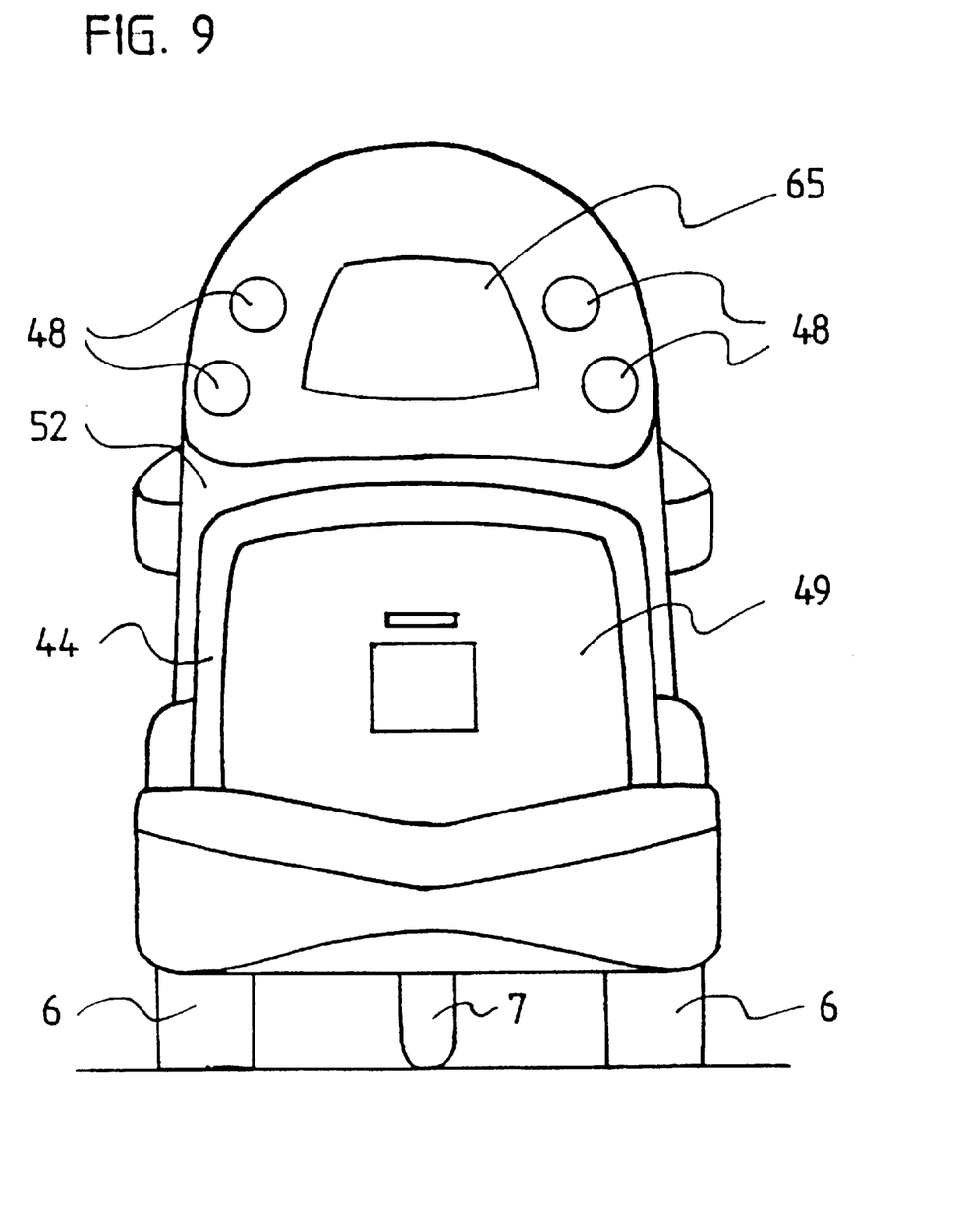
FIG. 9 is a rear view of the motor-driven three-wheeled vehicle with a body.

FIG. 9 shows a rear view of the vehicle. The rear body part 44, underneath which are accommodated the suspension for the rear wheels 6, the braking system and a stabilizer device, will be described in detail below. In other respects the rear body part 44 remains largely free of mechanical components and hence forms a spacious boot with a capacity of approximately 150 litres. The rear body part 44 advantageously has a lockable, pneumatically sprung rear flap 49 which provides access to the storage area between the two rear wheels 6. The rear body part 44 can have an additional storage surface which can be folded down backwards, with the rear flap then adjoining the rear end of this additional storage surface. The open triangles formed thereby at the sides are closed off, for example, with flexible surfacing material or rigid boards which can be swung out from the boot into the triangles like door wings. Thus the boot can be substantially enlarged if required. The rear lights 48 are mounted at the top on the rear end of the front body part 52 so that lights such as tail lights, indicators, brake lights and fog lights can easily be seen by all other traffic users. A rear window 65 is arranged between the rear lights to ensure an unhindered view to the back when reversing.

Figure 10:
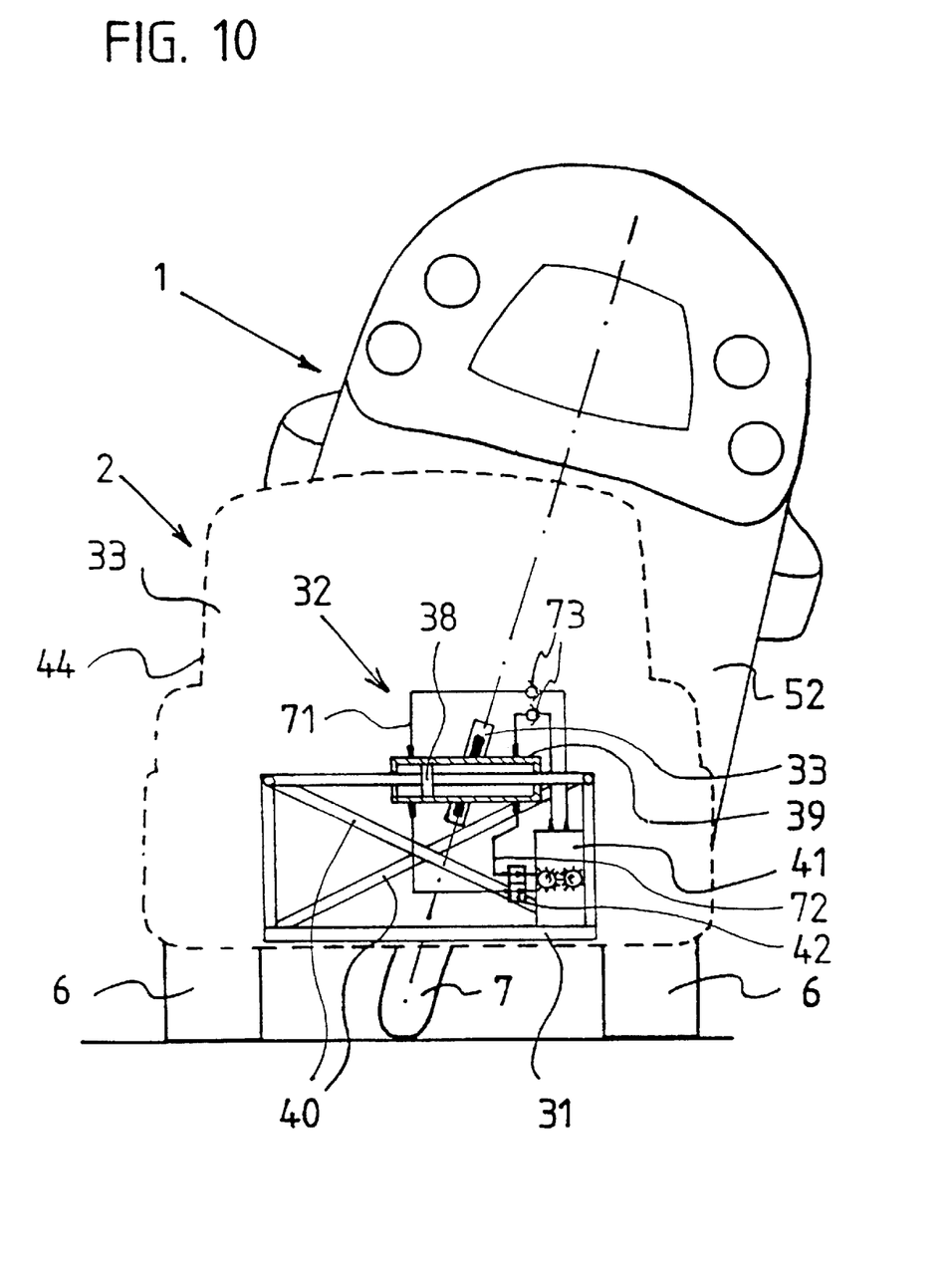
FIG. 10 is a rear view of the motor-driven three-wheeled vehicle negotiating a curve to the right, with a stabilizer device.

FIG. 10 shows a rear view of the vehicle as it negotiates a curve to the right with the rear body part 44, which negotiates the curve upright, shown by a dashed line in order to provide a free view of the stabilizer device which serves to keep the tilting of the two vehicle parts 1, 2 in relation to each other under control. However, the stabilizer device shown here is merely one of several possible embodiments. An enforced tilting or blocking of the two vehicle parts 1, 2 that are tiltable relative to each other can of course also be achieved by other means. In normal motion, i.e. when the vehicle has attained a speed at which righting moments occur so that the front part 1 travels in a stable manner like a motorbike, the two vehicle parts 1, 2 are completely freely tiltable relative to each other around the tilt axle 3 already described. If one travels through a curve as shown here then the front vehicle part 1 inclines like a motorbike towards the inside of the curve while the rear vehicle part 2 with its body superstructure 44 shown by a dashed line travels through the curve upright on both wheels 6. The front vehicle part 1 rights itself again when it leaves the curve.

FIG. 10 also shows a diagram of the stabilizer device which comprises a horizontally disposed hydraulic cylinder 39 that acts on both sides, inside which a piston 38 can be moved to and from, with a piston rod on each side. Both piston rods are attached by their ends to the frame 31 of the rear vehicle part 2. The frame 31 is reinforced with struts 40 to allow it to absorb the forces exerted by the piston rods. The hydraulic cylinder 39 and its housing are guided in a guide rail 33 which is attached to the front vehicle part 1 in the direction of the tilt radials. On each side of the piston a separate hydraulic circuit 71, 72 is connected to the hydraulic cylinder 39. These circuits proceed from a common hydraulic pump 41 to separate one-way valves 73 into the hydraulic cylinder 39 and from there back again to the common hydraulic pump 41 via separate controllable one-way valves 42. If the controllable one-way valves 42 are both open with the hydraulic pump 41 running, then it conveys hydraulic oil via the one-way valves 73 through both circuits 71, 72 and hence the hydraulic cylinder 39 is merely flushed. The hydraulic forces acting on the piston 38 are negligibly small and cancel out each other. Hence the two vehicle parts 1 and 2 are free to tilt in relation to each other. If the front vehicle part 1 now needs to be intentionally tilted in relation to the rear part 2, e.g. from the position shown here to the left, the bottom one-way valve 42 is shut off to the circuit 71. The hydraulic oil, which flows from the hydraulic circuit 71 into the hydraulic cylinder 39, now builds up in the cylinder space to the left of piston 38 and causes the latter to be moved to the right inside cylinder 39, i.e. the hydraulic cylinder 39 moves to the left together with the guide rail 33 and the front vehicle part 1. Once the required angle of tilt is achieved, the second one-way valve 42 is shut off to the hydraulic circuit 72 as well, whereupon the piston 38 in the hydraulic cylinder 39 is exposed to pressure from both sides and held in this position because the hydraulic oil cannot escape in any direction. The vehicle has thus adopted a fixed configuration as regards parts 1, 2 which are tiltable relative to each other and can be driven at a low speed like a conventional three-wheeler with a stable frame. This is desirable at slow speeds or when stationary.

A special problem now lies in releasing the fixed configuration, i.e. in allowing the front vehicle part 1 and the rear vehicle part 2 to tilt when in motion, given that starting from this fixed configuration, the fixed configuration would break apart abruptly at a certain speed and the two vehicle parts 1 and 2 would tilt freely in relation to one another. If one were to drive off from a stationary position with a stable configuration between the rear vehicle part 2 and the front vehicle part 1 and then drive into a curve at a speed still below the pre-set minimum speed and then accelerate beyond this minimum speed while negotiating the curve and if the stable configuration were released abruptly at that moment, the front vehicle part 1 would fall over towards the outside of the curve. Therefore, if the front vehicle part 1 negotiates a curve whilst accelerating from a stationary position it must forcibly continue to be tilted towards the inside of the curve as the acceleration progresses. This is accomplished with a special automatic tilting system.

The automatic system includes a measuring device for the transverse acceleration acting on the front vehicle part 1, preferably a pendulum device which transmits the pendulum position to a microprocessor as an input signal. The microprocessor also receives the current speed as an input value and it processes this information to calculate the required inclination of the front vehicle part 1 on the basis of a pre-set characteristic curve. If the vehicle is now driven off from a stationary position and directly into a curve in a stable configuration, the centrifugal force that takes effect causes the pendulum in the front vehicle part immediately to swing out towards the outside of the curve. This creates an angle between the pendulum and the vertical axis of the front vehicle part 1. The size of this angle is measured and serves as the input value for the microprocessor. The microprosor processes this input signal together with the speed of the vehicle to calculate a position value for the stabilizer device. As a result, the hydraulic cylinder is immediately moved into a position where the pendulum angle of deflection is minimized in relation to the vertical axis of the front vehicle part 1 by the front vehicle part 1 being correspondingly tilted. When the vehicle is driven from a stationary position with a fixed configuration between front vehicle part I and rear vehicle part 2, this is how the inclination is initially continuously forcibly adjusted while the curve is negotiated and then adopted freely from a certain pre-set minimum speed onwards, e.g. 3 km/h, and the two hydraulic circuits remain open and therefore no hydraulic forces act on both sides of the piston. Conversely, if the pre-set minimum speed is not reached in a curve then the stabilizer device is triggered and takes effect at the necessary angle of tilt already adopted by front vehicle part 1 so that the latter is held smoothly in the corresponding position. If the speed is reduced further, the entire front vehicle part 1 is actively guided and held in position in line with the required tilt determined by the pendulum device.

Figure 11:
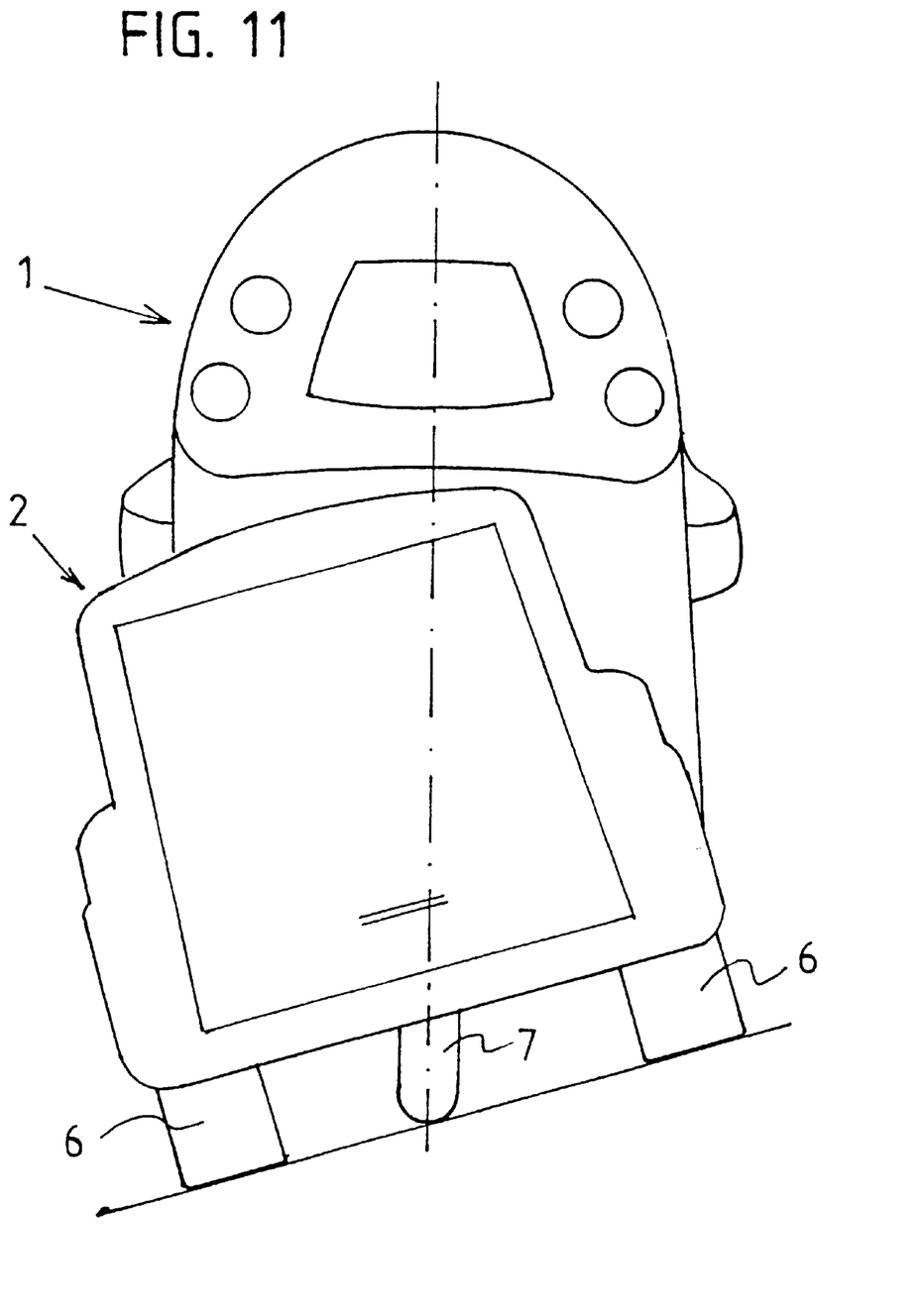
FIG. 11 is a rear view of the motor-driven three-wheeled vehicle stopping on a sloping surface, with a stabilizer device in action.

There is essentially only one critical driving maneuver which cannot satisfactorily be controlled with the automatic system just described, namely when the rear vehicle part 2 is transversely tilted due to the road, as shown in FIG. 11. This is the case when one drives at an angle onto a sloping surface and then stops there, or when one wants to drive off from a sloping surface on which has parked along the contour of the curve. This may happen, for example, when one has to park on a sloping parking space where the parking places are arranged horizontally, or when one simply drives the rear wheel up onto the edge of the pavement and then stops. Hence if one drives up at a low speed at which the stabilizer device is inactive, allowing the front vehicle part 1 to tilt to the side to its maximum then, when the vehicle is driven onto the parking space, the rear vehicle part 2 will be tilted askew in line with the lateral inclination of the parking space surface while the front vehicle part 1 stands upright just like a motorbike stands upright when driven on a sloping surface along the contour of the curve. This situation is shown in FIG. 11. Here, it might be dangerous if, during a stopping maneuver, the vehicle speed drops below the pre-set minimum speed thereby suddenly triggering the stabilizer device as would happen if the rear vehicle part 2 were standing on a horizontal surface. This would cause the front vehicle part 1 to tilt suddenly and quickly towards the slope. The tilt of the front vehicle part 1 would then be stopped again and in doing so, its center of gravity formed in conjunction with the driver could be laterally displaced beyond the valley-sided connection line between the front wheel 7 and the rear wheel 6, which would inevitably cause the entire vehicle to topple over. To prevent this, the tilt of the rear vehicle part 2 must be counterbalanced, i.e. the stabilizer device must "know" whether the rear vehicle part 2 is standing askew and if so, to what extent. In order to accomplish this compensation a measuring device is needed to measure the lateral inclination of the rear vehicle part 2. Because this measurement is only relevant for very low speeds at which the transverse accelerations acting on the vehicle are insignificant, a pendulum can also be used for this purpose. A water level could also be used as an alternative measuring device. The inclination measuring device always indicates the direction and the degree of the transverse tilt of the rear vehicle part 2 at low speeds and these values are also processed by the microprocessor of the stabilizer device. Hence the microprocessor can calculate the desired position of the hydraulic cylinder 39 for every conceivable driving situation. This stabilizer device basically ensures that the transverse acceleration acting on the front vehicle part 1 in all driving situations between the speed zero and the pre-set minimum speed at which the stabilizer device becomes inactive is minimized by forcing the front vehicle part 1 to tilt correspondingly. In doing so, the vehicle automatically takes into account the transverse tilt of the rear vehicle part 2, which indeed serves as a reference basis for the degree to which the stabilizer device needs to be tilted, i.e. for the position to be adopted by the hydraulic cylinder 39.

Figure 12:
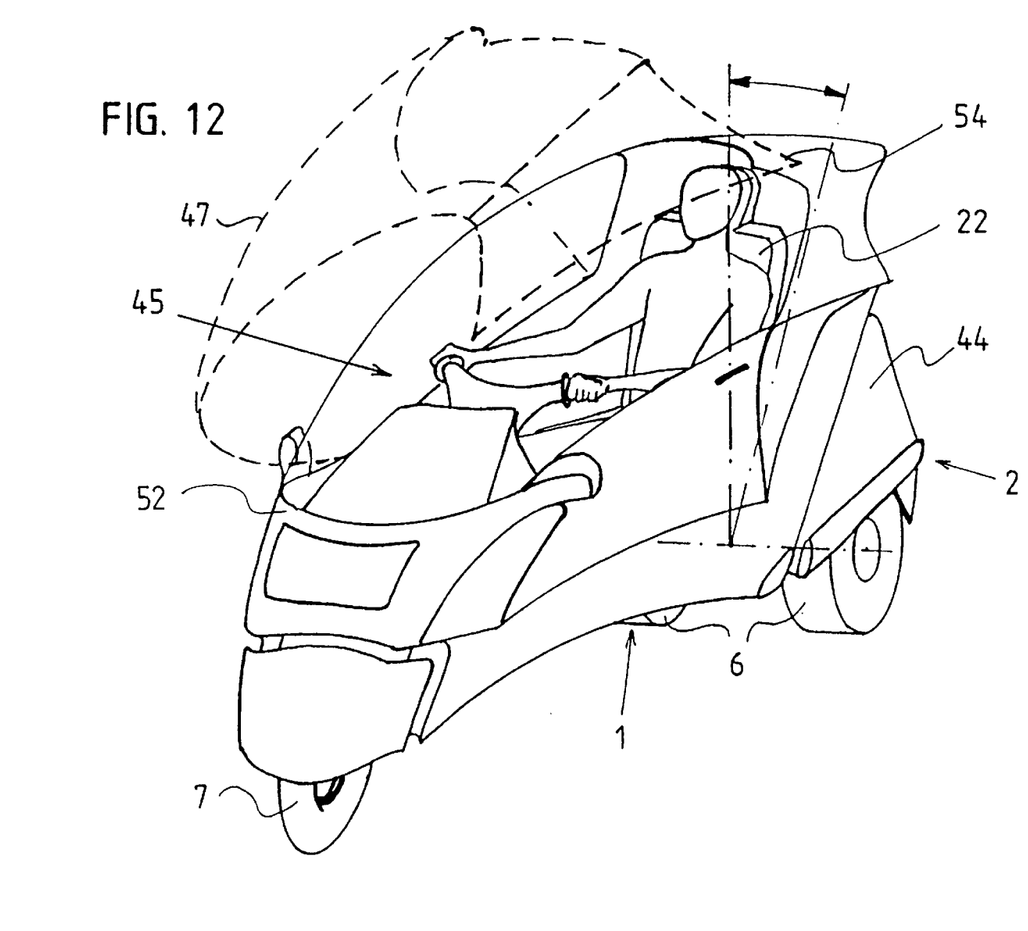
FIG. 12 is a perspective view of the motor-driven three-wheeled vehicle negotiating a curve to the left.

Finally, FIG. 12 shows a perspective view of the motor-driven three-wheeled vehicle negotiating a curve. The bonnet window 47 and the door 54 are also indicated in the swung-up position by dashed lines. When negotiating a curve, the front vehicle part 1 tilts like a motorbike towards the inside of the curve while the rear vehicle part 2 always travels upright on its two wheels 6. The degree of the tilt is indicated here by a dash-dot angle. When the vehicle is in motion, this angle of tilt to the side can be up to approximately 40°. This configuration with a tilting vehicle part 1 on the one hand and a vehicle part 2 that remains upright on the other hand provides the advantage of a particularly pleasant driving feel, and at the same time, the upright rear vehicle part 2 following through behind offers the advantage of increased safety on slippery roads. While a crash is almost unavoidable on a motorbike if the rear part swerves away unexpectedly, any swerving away of the rear part 2, which runs on two vertical wheels 6, will not cause any uncontrollable driving state, as practical tests have shown. Thus the three-wheeled vehicle can also be used without reservation on snow-covered roads.

The three-wheeled vehicle can be powered by various different engines. The most reliable is a petrol engine, because it is highly developed and offers a very good weight ratio. If power is less important than a long service life and economy then the use of small diesel engines is also conceivable. Electric engines can be used as emission-free engines, but they do not perform as well as combustion engines, regarding power and operating range. The most obvious choice is a water-cooled 4-stroke petrol engine with multivalve technology, which offers a low weight ratio combined with low noise and emission levels. Hence a minimum solution would be a 125 ccm scooter engine that provides approximately 12 kW power. However, engines with a bigger capacity can also be used, e.g. with a 250 ccm capacity or even more, as already commonly used for scooters. These types of engines already have a built-on automatic gear system. However, because a scooter drive unit has to be assembled around approximately 90° to be installed in this three-wheeler, the engine has to be slightly modified and fitted with a dry sump lubrication system. For bigger production runs it will be worthwhile building special engines which will then be developed from the start for upright installation. The excellent aerodynamics of such a vehicle combined with a minimal frontal area means that when powered by a conventional 125 ccm scooter engine the fuel consumption is likely to be around 2 litres per 100 km. More powerful models can naturally also be built, for more than just one person and with much more powerful engines.

Because the driver cabin 45 can be completely closed when the vehicle is travelling it is possible to heat or cool the cabin efficiently. To heat it up, a fan element mounted on the engine or in the driver cabin 45 is used, which blows air through a heat exchanger linked to the engine. In this manner the heat from both an air-cooled or a water-cooled engine can be utilized in the prior art way. The heated air is then blown into the driver cabin 45 at several points, and also onto the inside of its windscreen. The engine can also drive a compressor built directly onto it which compresses a coolant so that the latter is connected via hoses with a cooler and a heat exchanger, with these elements being rigidly fixed to the frame of the front vehicle part 1. This cooling cycle can be used to air-condition the driver cabin 45 interior by means of a fan. The windscreen has a windscreen wiper which is powered by an electric motor in the conventional manner. For aerodynamic reasons the two body parts 44, 52 are designed so that they connect very closely when the vehicle travels in a straight line so as to avoid marginal vortexes in the air flowing by, and they must also be adapted to each other so that they can be tilted relative to each other by a certain, fixed tilting zone around the tilt shaft 25.

The closed and lockable body 44, 52 also means that the driver can use this vehicle for shopping trips. When articles are purchased at different places, the goods already bought can be stored in the vehicle or in its storage space and the storage space can be locked, after which one can leave the vehicle here or at another shopping point and make further purchases. In comparison, the driver of a scooter or motorbike always has the problem of having to carry around all the purchased articles with her or him while shopping in different shops because they cannot be stowed away safely anywhere. Furthermore, the driver cabin 45 offers all the comfort of a car interior. In particular, the noise level is low due to the use of noise and thermal insulating material between the engine and the inside of the cabin 45, which in turn also allows the operation of a built-in radio or cassette player and a mobile telephone, which is only possible to a very limited degree on a motorbike. The vehicle design also allows for embodiments with two seats arranged one behind the other. For engineers, suppliers, couriers etc. this vehicle can also, if required, tow a single-axle trailer with a track of no more than that of the rear vehicle part 2 in order to create additional transport capacity. The delivery of many day-to-day business items does not absolutely require an entire automobile in order to deal efficiently with these trips and transport jobs. By far the greater part of the home-to-work travelling currently done with cars could be accomplished just as comfortably but more ecologically, more economically and with greater maneuverability with this motor-driven three-wheeled vehicle. Above all, congestion on inner-city roads would be alleviated since two such vehicles can drive next to each other in one lane and the lack of parking spaces would be made less acute because up to four such vehicles can be accommodated on a conventional parking space for one car.

What is claimed is:

1. In a motor-driven three-wheeled vehicle for road traffic having two parts (1, 2) that can be tilted around a longitudinal axis, a rear part (2) of the two parts (1, 2) having a chassis for two-track rear wheels (6) and a front part (1) of the two parts (1, 2) can be tilted relative to the rear part (2) and accommodates a driver seat (22), the improvement comprising: a front wheel suspension having two triangular steering elements (13, 14; 66,1 4) arranged one on top of the other and each tiltable up and down around a horizontal axis across the longitudinal axis of the vehicle and bearing on a front side a steering axle of a front wheel (7), and at least one triangular steering element (14, 66) rests against one of a frame (12) and a monocoque (52) of the front part (1) using a first strut with a first shock absorber (16, 69).

2. In the motor-driven three-wheeled vehicle of claim 1, wherein a lower triangular steering element (66) of the triangular steering elements (14, 66) comprises a one-arm rocker arm (66) which guides the steering axle of the front wheel (7) from one side in a region below a wheel axle (5) with the one-arm rocker arm (66) resting against the one of the frame (12) and the monocoque (52) with a strut with a shock absorber (69).

3. In the motor-driven three-wheeled vehicle of claim 2, wherein the front wheel suspension (11) carries beside the front wheel (7) an engine (8) with a gear (9) for driving the vehicle, a structural unit comprising the engine (8), the gear (9) and the front wheel (7) is positioned to a side around the steering axle (15), the steering axle running downwards at an angle in a direction of travel and running downwards at a position behind the wheel axle (5) of the front wheel (7).

4. In the motor-driven three-wheeled vehicle of claim 3, further comprising a closed body having a frame tiltable around the longitudinal axis and having a rear body part (44) and a front body part (52), the front body part (52) can be tilted relative to the rear body part (44) around the longitudinal axis, with the rear body part (44) being rigidly connected with a frame of the rear part (2) and the front body part (1; 52) being designed as a driver cabin (45) with a lockable entry and one of an exit space and a door.

5. In the motor-driven three-wheeled vehicle of claim 4, wherein the rear part (2) comprises a rear frame (31) with two trailing arms (27, 28) running backwards approximately horizontally for the rear wheels (6) and each supported against an upper frame part of the frame (31) of the rear part (2) in a vicinity of a rear end of each of the trailing arms (27, 28) by a second strut with a second shock absorber (29, 30).

6. In the motor-driven three-wheeled vehicle of claim 5, wherein the driver cabin (45) has at least one car seat (22), an accelerator pedal (20) and a brake pedal (21) are disposed in a foot area of the driver cabin (45), and a handlebar (17) is mounted within the driver cabin (45).

7. In the motor-driven three-wheeled vehicle of claim 6, further comprising a stabilizer device (32) by which the two parts (1, 2) which can be tilted relative to each other, can be forcibly tilted relative to each other and held in place in a particular tilt position below a pre-set speed.

8. In the motor-driven three-wheeled vehicle of claim 7, wherein the stabilizer device (32) has control means and a hydraulic pump (41) and a hydraulic cylinder (39) containing a piston (38) that acts on both sides, and which is guided on a guide rail (33) mounted on the front part (1) and extends along tilt radials with two piston rods attached to the frame (31) of the rear part (2), and the hydraulic cylinder (39) is connected on each side of the piston (38) to hydraulic circuits (71, 72) each having controllable one-way valves (42) to bring and hold the hydraulic cylinder (39) into a particular position.

9. In the motor-driven three-wheeled vehicle of claim 8, wherein the control means comprise a device for measuring a transverse acceleration on the front part (1), a transverse inclination of the rear part (2) and a vehicle speed, and a microprocessor control for processing measured values into output signals for actuating the one-way valves (42) so that the transverse acceleration on the front part (1) can be minimized by setting and maintaining a calculated tilt in driving situations below a pre-set speed.

10. In the motor-driven three-wheeled vehicle of claim 9, wherein the driver cabin (45) has a bonnet window (47) which is slid forward along rails (46) disposed on both sides of the driver cabin (45), the bonnet window (47) can be swung up to a side to allow a driver to get in and out of the driver cabin (45), and the rear part (44) has a lockable, pneumatically sprung rear flap (49).

11. In the motor-driven three-wheeled vehicle of claim 1, wherein the front wheel suspension (11) carries beside the front wheel (7) an engine (8) with a gear (9) for driving the vehicle, a structural unit comprising the engine (8), the gear (9) and the front wheel (7) is positioned to a side around a steering axle (15), the steering axle running downwards at an angle in a direction of travel and running downwards at a position behind a wheel axle (5) of the front wheel (7).

12. In the motor-driven three-wheeled vehicle of claim 1, further comprising a closed body having a frame tiltable around the longitudinal axis and having a rear body part (44) and a front body part (52), the front body part (52) can be tilted relative to the rear body part (44) around the longitudinal axis, with the rear body part (44) being rigidly connected with a frame of the rear part (2) and the front body part (1; 52) being designed as a driver cabin (45) with a lockable entry and one of an exit space and a door.

13. In the motor-driven three-wheeled vehicle of claim 1, wherein the rear part (2) comprises a rear frame (31) with two trailing arms (27, 28) running backwards approximately horizontally for the rear wheels (6) and each supported against an upper frame part of the frame (31) of the rear part (2) in a vicinity of a rear end of the trailing arms (27, 28) by a second strut with a second shock absorber (29, 30).

14. In the motor-driven three-wheeled vehicle of claim 1, wherein a driver cabin (45) has at least one car seat (22), an accelerator pedal (20) and a brake pedal (21) are disposed in a foot area of the driver cabin (45), and a handlebar (17) is mounted within the driver cabin (45).

15. In the motor-driven three-wheeled vehicle of claim 1, further comprising a stabilizer device (32) by which the two parts (1, 2) which can be tilted relative to each other, can be forcibly tilted relative to each other and held in place in a particular tilt position below a pre-set speed.

16. In the motor-driven three-wheeled vehicle of claim 1, wherein a stabilizer device (32) has control means and a hydraulic pump (41) and a hydraulic cylinder (39) containing a piston (38) that acts on both sides, and which is guided on a guide rail (33) mounted on the front part (1) and extends along tilt radials with two piston rods attached to the frame (31) of the rear part (2), and the hydraulic cylinder (39) is connected on each side of the piston (38) to hydraulic circuits (71, 72) each having controllable one-way valves (42) to bring and hold the hydraulic cylinder (39) into a particular position.

17. In the motor-driven three-wheeled vehicle of claim 16, wherein the control means comprise a device for measuring a transverse acceleration on the front part (1), a transverse inclination of the rear part (2) and a vehicle speed, and a microprocessor control for processing measured values into output signals for actuating the one-way valves (42) so that the transverse acceleration on the front part (1) can be minimized by setting and maintaining a calculated tilt in driving situations below a pre-set speed.

18. In the motor-driven three-wheeled vehicle of claim 1, wherein a driver cabin (45) has a bonnet window (47) which is slid forward along rails (46) disposed on both sides of the driver cabin (45), the bonnet window (47) can be swung up to a side to allow a driver to get in and out of the driver cabin (45), and the rear part (44) has a lockable, pneumatically sprung rear flap (49).

* * * * *